July 31, 1962 C. W. HAAS, JR 3,047,738

RING COUNTER PULSE DISTRIBUTOR USING A SINGLE TWO-STATE DEVICE PER STAGE AND A SOURCE OF PHASE-OPPOSED ALTERNATING VOLTAGES FOR DRIVING COMMON PUSH-PULL LINES

Filed June 12, 1958 2 Sheets-Sheet 1

INVENTOR
C. W. HAAS, JR.

BY Walter M. Hill

ATTORNEY

RING COUNTER PULSE DISTRIBUTOR USING A SINGLE TWO-STATE DEVICE PER STAGE AND A SOURCE OF PHASE-OPPOSED ALTERNATING VOLTAGES FOR DRIVING COMMON PUSH-PULL LINES

Filed June 12, 1958 2 Sheets-Sheet 2

INVENTOR
C. W. HAAS. JR.
BY Walter M. Hill
ATTORNEY

United States Patent Office 3,047,738
Patented July 31, 1962

3,047,738

RING COUNTER PULSE DISTRIBUTOR USING A SINGLE TWO-STATE DEVICE PER STAGE AND A SOURCE OF PHASE-OPPOSED ALTERNATING VOLTAGES FOR DRIVING COMMON PUSH-PULL LINES

Charles W. Haas, Jr., Morris Plains, N.J., assignor to Bell Telephone Laboratories, Incorporated, New York, N.Y., a corporation of New York Filed June 12, 1958, Ser. No. 741,491
15 Claims. (Cl. 307—88.5)

Figure 1:
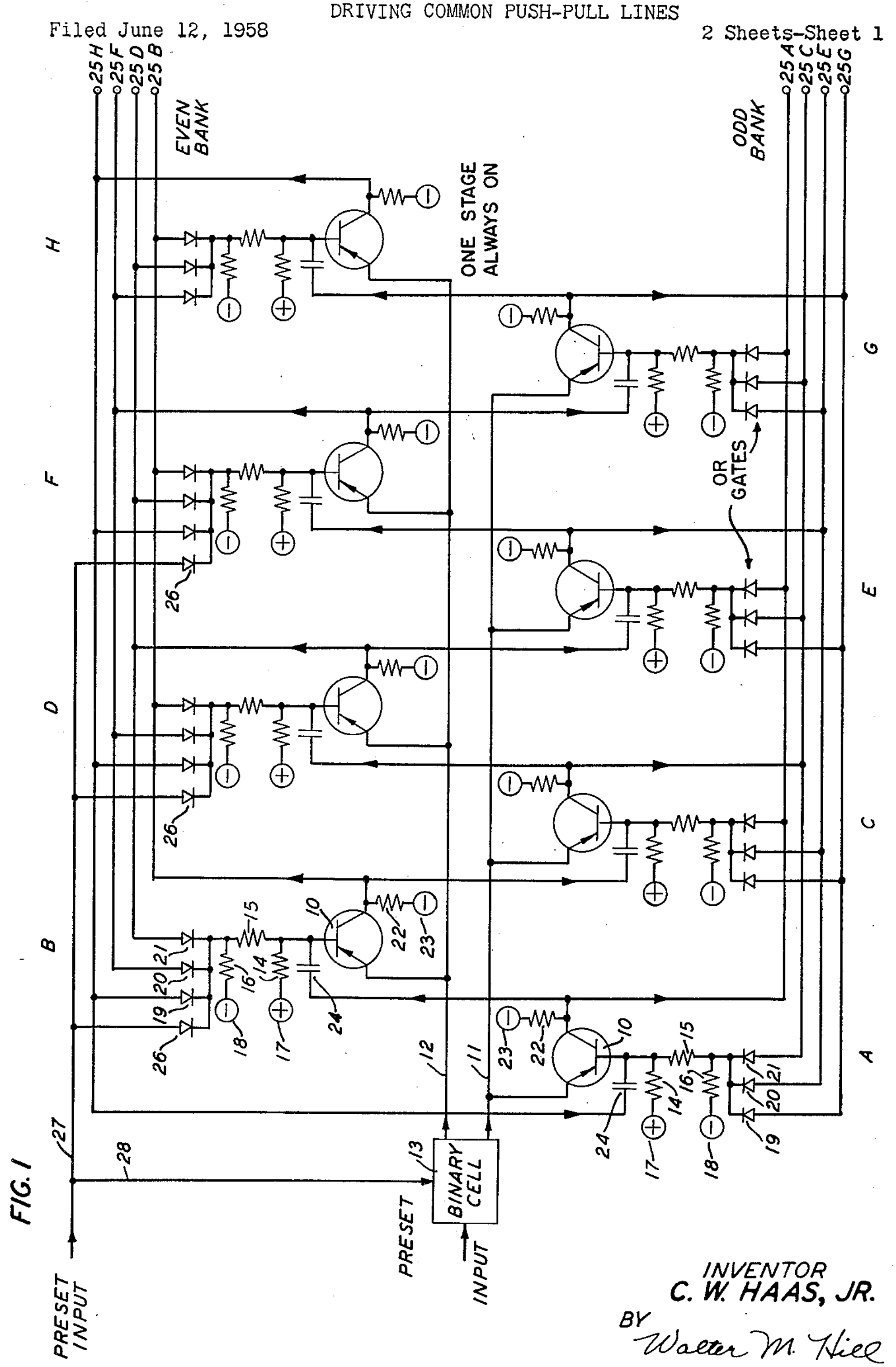

This invention relates to pulse distributors and, in particular, to ring counter circuits for successively producing pulses at a plurality of outputs.

Pulse distributors are frequently used in pulse handling apparatus for successively producing pulses at a plurality of control points in response to a series of input pulses. These successively produced pulses are used for counting purposes or applied to various circuits for energizing these circuits in a sequential manner. When transforming information into groups of pulses and spaces, for example, successively produced pulses are used for sequentially enabling a series of gating circuits so that the pulses and spaces occur at particular positions within the groups.

One form of pulse distributor is the ring counter circuit. A ring counter circuit is a loop of interconnected two-state devices arranged so that one and only one is in a particular state at a given time and, as the input signals are applied, the position of the particular state is moved in a step-by-step manner around the loop. Although various ring counter circuits are disclosed in the prior art, it has been found that the ones for use in the megacycle frequency range are usually more complex, and therefore require more components, than those designed for use at lower frequencies. This is undesirable because, in general, as the number of components in a piece of apparatus is increased, the space, weight and power requirements are increased and the apparatus becomes less reliable.

An object of the present invention is to reduce the number of components necessary to distribute pulses at rates in the megacycle frequency range.

Another object is to distribute a series of pulses so that the prescribed order of distribution is ensured.

In one of its broader aspects, the invention takes the form of a ring counter which includes a binary cell and two banks of two-state devices of the single active element type. The binary cell, which is conventional in nature, produces a pair of phase-opposed square waves in response to a series of input pulses. The banks of devices are interconnected in a novel manner to form a series of electronic switches which are sequentially enabled in response to the phase-opposed square waves. In particular, each of the devices has input, control and output terminals and is adapted to assume one of its two states in accordance with the potential difference between its input terminal and its control terminal. (For purposes of convenience, these two states are referred to as the Off and On states with the On state representing the particular state which one and only one device is in at any one given time.) The potential difference between the input and control terminals of each of the devices depends upon three potentials. One of these potentials is supplied by the binary cell which applies its phase-opposed outputs to the devices so that the respective banks of devices tend to turn On and Off in a phase-opposed manner. In accordance with one feature of the invention, the second potential applied to a device comprises a transient produced when the preceding device in the opposite bank is turned Off. These transients cooperate with the binary cell outputs to cause the devices to which they are applied to turn On before the remaining devices in their banks. This feature of the invention therefore provides a steering action which causes successive devices in the respective banks to be turned On. In accordance with another feature of the invention, when a device is in its On state, a third potential is applied to each of the remaining devices in its bank so that these devices are prohibited from turning On. This holding feature therefore permits one and only one device to be in its On state at any one given time.

In one embodiment of the present invention, each of the two-state devices comprises a transistor having emitter, base and collector electrodes which comprise input, control and output terminals, respectively. The phase-opposed outputs produced by the binary cell are applied to the emitter electrodes so that the banks are alternately energized. The steering feature of the invention comprises a capacitive cross-connection between the collector electrode of each transistor and the base electrode of the succeeding transistor in the opposite bank. By this arrangement, when a transistor which has been in a conducting or On state is turned Off, a pulse is coupled to the control input of the subsequent transistor in the opposite bank. This pulse adds to the binary cell output applied to that bank to turn that transistor On before the remaining ones in its bank. The holding feature of the invention comprises a plurality of OR gates having their outputs connected to respective base electrodes of the transistors and the inputs of each gate respectively connected to the collector electrodes of the remaining transistors in its bank. By this arrangement, when a transistor is in the On condition, the OR gates associated with the remaining transistors in its bank keep their transistors from turning On. As the binary cell wave applied to the transistors in the other bank is in a direction to maintain them in the Off state, only one transistor is in the On state at any one time.

Figures 2, 3:
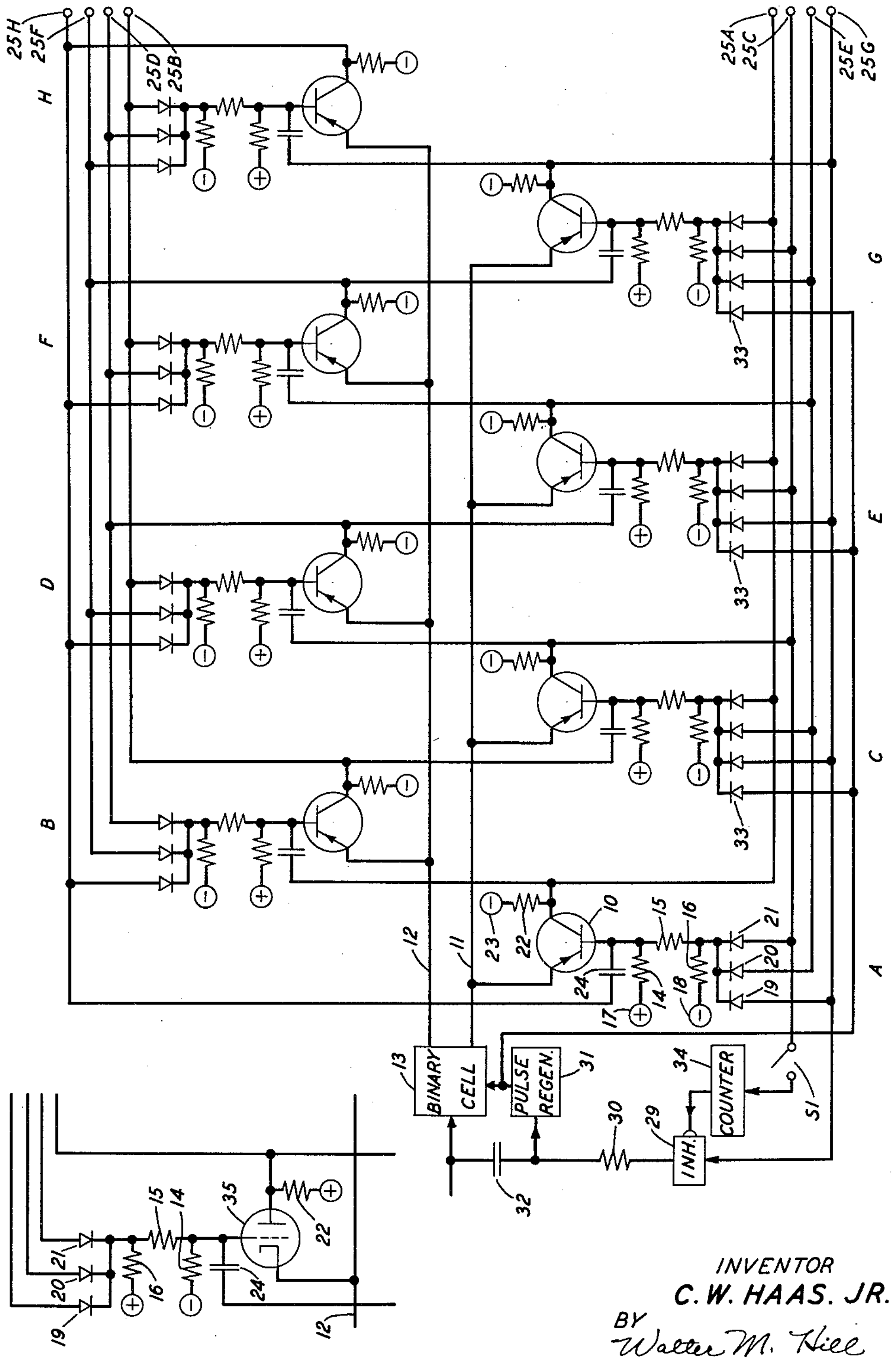

Other objects and features of the invention will be apparent from a study of the following detailed descriptions of several specific embodiments. In the drawings:

FIGS. 1 and 2 show schematic diagrams of ring counter arrangements illustrating the principles underlying the invention; and FIG. 3 shows a schematic diagram of a vacuum tube circuit that may be used in place of the transistor circuits employed in the embodiments of FIGS. 1 and 2.

FIG. 1 shows a schematic diagram of one embodiment of the present invention which utilizes eight two-state devices, each of which comprises a single transistor. The actual number of two-state devices used when practicing the invention is determined by the commutation desired. For purposes of convenience, the devices and their associated circuitry are identified as circuits A through H, respectively. Although circuits A through H may be considered as a single series of circuits, they are illustrated and described as existing in two banks of circuits in order to facilitate the explanation. The circuits A, C, E and G comprise one bank referred to hereinafter as the odd bank and circuits B, D, F and H comprise a second bank referred to hereinafter as the event bank. Furthermore, with the exception of an additional input terminal and diode associated with circuits B, D and F, the circuits are identical with respect to one another and, therefore, the same reference numbers have been used to identify similar components.

Each of the circuits A through H includes a PNP transistor 10 having an emitter electrode, a base electrode and a collector electrode. Transistors of the NPN type may be utilized in place of the PNP transistors by making polarity reversals well known to those skilled in the art. The emitter electrodes of each bank are respectively connected by a pair of buses 11 and 12 to the output terminals of a binary cell 13. Binary cell 13 may comprise a conventional bistable circuit having a steering diode type of input circuit which causes it to change state with each input pulse. Binary cell 13 also has a preset input lead 28 which, when energized, causes it to assume a particular one of its two states. The purpose of this preset input is more fully discussed hereinafter.

The base electrodes of transistors 10 are respectively connected to the output terminals of a plurality of OR gates each of which comprises resistors 14, 15 and 16, a positive potential source 17, a negative potential source 18 and diodes 19, 20 and 21. The three resistors 14, 15 and 16 of each gate are connected in series between sources 17 and 18 and have values so that the potentials at both junctions formed by the series connections are negative in nature. The less negative junctions between resistors 14 and 15 comprise the OR gate output terminals. In each gate, the cathode terminals of diodes 19, 20 and 21 are connected to the other junction between resistors 15 and 16 while their anode terminals comprise the OR gate input terminals. The input terminals of each of the OR gates are respectively connected to the collector electrodes of the remaining transistors 10 in its bank. From this it is obvious that in practicing the invention, the number of inputs for an OR gate is determined by the number of two-state devices utilized in the bank containing the gate.

The collector electrode of each of the transistors 10 is connected through a resistor 22 to a negative potential supply 23 and through a capacitor 24 to the base electrode of its succeeding transistor 10 in the opposite bank. The collector electrodes are also respectively connected to output terminals 25A through 25H.

The embodiment of FIG. 1 contains a presetting circuit which, when activated, places transistor 10 in circuit H in its On state. As explained in detail hereinafter, presetting transistor 10 of circuit H in its On state causes the first input pulse to binary cell 13 to produce the first output on output terminal 25A. In particular, this presetting circuit includes three diodes 26 having their cathodes respectively connected to the junction to which diodes 19, 20 and 21 are connected in circuits B, D and F and leads 27 and 28 for applying the presetting pulse to the anode terminals of diodes 26 and the presetting input of binary cell 13. The presetting circuit may be connected to other combinations of circuits A through H so that a circuit other than circuit H is turned On. Furthermore, more than one presetting circuit may be utilized so that counting may be started with any one of a number of circuits.

Before discussing the operation of the embodiment of FIG. 1, a few remarks are presented with respect to the potential levels occurring at several points within the embodiment under different conditions. The phase-opposed square waves produced by binary cell 13 alternate between ground (zero) potential level and a negative potential level. As previously mentioned, resistors 14, 15 and 16 and sources 17 and 18 are chosen so that they normally apply negative potentials to the base electrodes of transistors 10. These negative potentials lie between the two levels supplied by binary cell 13 so that their combinations with the binary cell 13 outputs either forward or reverse bias the emitter-base junctions of transistors 10. Furthermore, when any transistor of a given bank is On, its collector is at substantially ground potential. This applies a ground potential input signal to each of the OR gates associated with the remaining transistors of the same bank so that a diode in each of these OR gates is forward biased and the junctions between their resistors 15 and 16 are clamped to ground. The resulting positive potentials between their resistors 14 and 15 apply a back bias to their emitter-base junctions to prevent their response to outputs from binary cell 13.

When a positive preset pulse is applied to lead 28, the state of binary cell 13 is changed, if necessary, so that bus 11 is at the aforementioned negative potential level while bus 12 is essentially at ground potential. As the negative potential applied to the emitter electrodes of transistors 10 in the odd bank is more negative than the potentials applied to their base electrodes, any On transistor 10 in this bank is turned Off while the others are maintained in their Off conditions. The positive pulse applied to lead 28 is also applied via lead 27 to diodes 26 of the OR gates in circuits B, D, and F which causes these OR gates to apply positive potentials to the base electrodes of their transistors 10. The positive potentials applied to these base electrodes turn any On transistor 10 to its Off state while maintaining the others in their Off states. Transistor 10 in circuit H turns On, if not already in this condition, because its emitter is essentially at ground potential while its base is at a negative potential. In accordance with one feature of the present invention, when one of the transistors 10 is in its On condition, the remaining transistors 10 are prohibited from turning On. In particular, when transistor 10 of circuit H is in its On state, its base and collector electrodes are essentially at ground potential. Because the collector electrode of this transistor is essentially at ground potential, diodes in the OR gates of circuits B, D and F are forward biased which causes positive potentials to be applied, after the positive presetting pulse ceases, to the base electrodes of transistors 10 in these circuits. These transistors are therefore maintained in their Off conditions. To summarize, applying a positive pulse to leads 27 and 28 leaves transistor 10 in circuit H in its On state and the remaining transistors 10 in their Off states.

The first input pulse to binary cell 13, after presetting the embodiment, causes the potentials on buses 11 and 12 to be interchanged. All of the transistors 10 in the even bank are now reverse biased while those in the odd bank are forward biased. Because transistors 10 in the even bank are reverse biased, transistor 10 in circuit H is turned Off. In accordance with another feature of the invention, when a transistor 10 is turned Off, the potential change on its collector electrode is coupled as a negative pulse to the base electrode of the succeeding transistor 10 in the opposite bank where it acts as a forward biasing potential. Therefore, when transistor 10 in circuit H is turned Off, a negative pulse is applied to the base electrode of transistor 10 of circuit A which increases the forward biasing potential between its base and emitter electrodes so that it turns On before the other forward biased transistors 10 in its bank can turn On. When transistor 10 of circuit A is turned On, OR gates of circuits C, E and G are caused to apply positive potentials to the base electrodes of their transistors 10 so that they are prohibited from turning On. On the second input pulse to binary cell 13, the potentials on buses 11 and 12 are interchanged, transistor 10 of circuit A is turned Off, a forward biasing pulse is applied to transistor 10 of circuit B whereby it is turned On and reverse biasing potentials are applied to the remaining transistors 10 in the even bank whereby they are held in their Off states. Subsequent input pulses result in the On state both alternating between the banks and progressing through the banks so that outputs appear on output terminals 25A through 25H in a sequential manner.

FIG. 2 illustrates another embodiment of the present invention which may be utilized either to commutate pulses to seven output terminals (i.e., an odd number of terminals) or, if desired, to commutate the pulses to either seven or eight terminals in accordance with a predetermined pattern. In particular, the embodiment of FIG. 2 includes that of FIG. 1 with the exception of the presetting circuit. If desired, the presetting circuit may be included but for the purposes of simplification it has been omitted.

In FIG. 2, the output of circuit G is coupled via an inhibitor 29 and a resistor 30 to the input of a pulse regenerator 31. The input trigger pulses to binary cell 13 are also applied to pulse regenerator 31 by way of capacitor 32. Resistor 30 and capacitor 32 form a summing circuit. With transistor 10 in circuit G in its Off condition, regenerator 31 is biased so as not to respond to the input trigger pulses. However, when this particular transistor is in its On condition, capacitor 32 receives a charge through resistor 30 which, in effect, places the next input pulse on a pedestal. The amplitude of this pulse is now sufficient to trigger regenerator 31.

Outputs from regenerator 31 are applied to binary cell 13 and the OR gates of circuits C, E and G via respective diodes 33. The output from regenerator 31 prohibits binary cell 13 from changing state, holds transistors 10 in circuits C and E in their Off states and turns Off transistor 10 in circuit G. Transistor 10 in circuit A, therefore, is the only transistor that can turn On when regenerator 31 produces a pulse. When transistor 10 in circuit G is turned Off, the charge on capacitor 32 is dissipated so that subsequent pulses cannot trigger regenerator 31 until transistor 10 in circuit G is again turned On. Circuits A through G are sequentially turned On and Off in a manner identical to those in the embodiment of FIG. 1. Because the On condition bypasses circuit H, this circuit may be eliminated if the counter is to be used only for counting to seven.

The embodiment of FIG. 2 contains a switch S1 which, when closed, applies the output of circuit C to a counter 34. Each time circuit C produces a predetermined number of pulse outputs, counter 34 enables the input of inhibitor 29. By enabling inhibitor 29, the output from circuit G is blocked from capacitor 32 and all of the circuits A through H operate in a manner identical to those in the embodiment of FIG. 1. The embodiment of FIG. 2 may therefore be used when it is desired to periodically produce a pulse on output terminal 25H which is in sequence with the pulses produced on the other output terminals 25A through 25G. Such a distributor is useful, for example, in a pulse code modulation multiplexing system when the encoding of message samples is periodically interrupted in order to insert synchronizing information. Transmitting and receiving terminals for such systems in which the present invention may be utilized are respectively disclosed in application Serial No. 704,929, filed December 24, 1957, by H. Jamison and R. L. Wilson, and application Serial No. 736,724, filed May 21, 1958, by F. T. Andrews, Jr. and H. Mann, which issued as Patent No. 2,984,706 on May 16, 1961.

FIG. 3 is a schematic diagram of a circuit arrangement that may be used in place of each of the circuits A through H of the embodiments of FIGS. 1 and 2. In particular, the arrangement of FIG. 3 is identical with circuits A through H of FIGS. 1 and 2 with the exceptions that a triode type of vacuum tube 35 is used in place of transistor 10 and all of the source polarities have been reversed to accommodate vacuum tubes. The cathode, grid, and plate electrodes of the tube 35 comprise the two-state device input, control and output terminals, respectively. The On condition of the circuit is that in which tube 35 is conducting and, therefore, its output signal comprises a negative going waveform.

Various modifications of the illustrated embodiments may be made without departing from the scope of the invention. The particular number of circuits A through H used in the disclosed embodiments, for example, is illustrative only. Furthermore, two-state devices other than transistors and vacuum tubes may be used in practicing the invention.

What is claimed is:

1. A ring counter comprising a plurality of two-state devices arranged in two banks, each of said devices having an input terminal, an output terminal and a control terminal and adapted to assume and be maintained in either of said two states solely in accordance with the potential between said input and control terminals, bistable means responsive to input pulses for producing a pair of phase-opposed alternating voltages and having a control means which when energized causes said bistable means to assume a particular one of its two states, means responsive to one of said alternating voltages for applying to said input terminals of said devices in one of said banks voltages which have amplitudes at least equal to a predetermined amplitude during substantially all of each of the alternate intervals between said input pulses and amplitudes less than said predetermined amplitude during substantially all of each of the remaining intervals between said input pulses, means responsive to the other of said alternating voltages for applying to said input terminals of said devices in the other of said banks voltages which have amplitudes at least equal to said predetermined amplitude during substantially all of each of said remaining intervals between said input pulses and amplitudes less than said predetermined amplitude during substantially all of each of said alternate intervals between said input pulses, means connecting the output terminal of at least one of said devices to the control terminal of its succeeding device in the opposite bank, means connecting the control terminal of at least one of said devices to the output terminals of the remaining devices in the same bank, and means for applying pulses to both the control means of said bistable means and the control terminal of at least one of said devices.

2. Apparatus in accordance with claim 1 in which said pulse applying means comprises a pulse regenerator having an input terminal and an output terminal, summing means having two input and one output terminals, means for applying said bistable means input pulses to one of said summing means input terminals, means connecting the remaining summing means input terminal to the output terminal of one of said devices, and means connecting said summing means output terminal to said pulse regenerator input terminal.

3. Apparatus in accordance with claim 2 in which said means connecting said remaining summing means input terminal to said device output terminal comprises means for periodically blocking the potential on said device output terminal from said summing means.

4. A ring counter comprising a plurality of two-state devices arranged in two banks, each of said devices having an input terminal, an output terminal and a control terminal and adapted to assume and be maintained in either of said two states solely in accordance with the potential between said input and control terminals, bistable means responsive to input pulses for producing a pair of phase-opposed alternating voltages and having a control terminal which when energized causes said bistable means to assume a particular one of its two states, means responsive to one of said alternating voltages for applying to said input terminals of said devices in one of said banks voltages which have amplitudes at least equal to a predetermined amplitude during substantially all of each of the alternate intervals between said input pulses and amplitudes less than said predetermined amplitude during substantially all of each of the remaining intervals between said input pulses, means responsive to the other of said alternating voltages for applying to said input terminals of said devices in the other of said banks voltages which have amplitudes at least equal to said predetermined amplitude during substantially all of each of said remaining intervals between said input pulses and amplitudes less than said predetermined amplitude during substantially all of each of said alternate intervals between said input pulses, means connecting the output terminal of at least one of said devices to the control terminal of its succeeding device in the opposite bank, a plurality of OR gates having input and output terminals, means respectively connecting said OR gate output terminals to the control terminals of at least two of said devices, means respectively connecting the input terminals of each of said OR gates to the output terminals of said devices associated with the remaining OR gates in the same bank, and means for applying pulses to the control terminal of said bistable means and to at least one of said OR gate inputs.

5. An arrangement in accordance with claim 4 in which said devices comprise transistors each of which has emitter, collector and base electrodes which comprise said input, output and control terminals, respectively.

6. Apparatus in accordance with claim 4 in which pulse applying means comprises a pulse regenerator having an input terminal and an output terminal, summing means having two input and one output terminals, means for applying said bistable means input pulses to one of said summing means input terminals, means connecting the remaining summing means input terminal to the output terminal of one of said devices, and means connecting said summing means output terminal to said pulse regenerator input terminal.

7. An arrangement in accordance with claim 6 in which said devices comprise transistors each of which has emitter, collector and base electrodes which comprise said input, output and control terminals, respectively.

8. Apparatus in accordance with claim 6 in which said means connecting said remaining summing means input terminal to said device output terminal comprises means for periodically blocking the potential on said device output terminal from said summing means.

9. An arrangement in accordance with claim 8 in which said devices comprise transistors each of which has emitter, collector and base electrodes which comprise said input, output and control terminals, respectively.

10. A ring counter comprising a plurality of two-state devices arranged in two banks, each of said devices having an input terminal, an output terminal and a control terminal and adapted to assume and be maintained in either of said two states solely in accordance with the potential between said input and control terminals, a source of phase-opposed alternating voltages, means responsive to one of said alternating voltages for applying to said input terminals of said devices in one of said banks voltages which have amplitudes at least equal to a predetermined amplitude during substantially all of each of the alternate intervals between said input pulses and amplitudes less than said predetermined amplitude during substantially all of each of the remaining intervals between said input pulses, means responsive to the other of said alternating voltages for applying to said input terminals of said devices in the other of said banks voltages which have amplitudes at least equal to said predetermined amplitude during substantially all of each of said remaining intervals between said input pulses and amplitudes less than said predetermined amplitude during substantially all of each of said alternate intervals between said input pulses, means connecting the output terminal of each of said devices to the control terminal of its succeeding device in the opposite bank, and means connecting the control terminal of each of said devices to the output terminals of the remaining devices in the same bank.

11. Apparatus in accordance with claim 10 in which said source comprises a bistable circuit having a control input which when energized causes said bistable circuit to assume a particular one of its two states and including means for applying pulses to both said bistable circuit control input and the control terminal of at least one of said devices.

12. A ring counter comprising a plurality of two-state devices arranged in two banks, each of said devices having an input terminal, an output terminal and a control terminal and adapted to assume and be maintained in either of said two states solely in accordance with the potential between said input and control terminals, a source of phase-opposed alternating voltages, means responsive to one of said alternating voltages for applying to said input terminals of said devices in one of said banks voltages which have amplitudes at least equal to a predetermined amplitude during substantially all of each of the alternate intervals between said input pulses and amplitudes less than said predetermined amplitude during substantially all of each of the remaining intervals between said input pulses, means responsive to the other of said alternating voltages for applying to said input terminals of said devices in the other of said banks voltages whch have amplitudes at least equal to said predetermined amplitude during substantially all of each of said remaining intervals between said input pulses and amplitudes less than said predetermined amplitude during substantially all of each of said alternate intervals between said input pulses, means connecting the output terminal of each of said devices to the control terminal of its succeeding one of said devices in the opposite bank, a plurality of OR gates having input and output terminals, means respectively connecting said OR gate output terminals to the control terminals of said devices, and means connecting the output terminal of each of said devices to one of the input terminals of each of said OR gates associated with the remaining devices in the same bank.

13. An arrangement in accordance with claim 12 in which said devices comprise transstors each of which has emitter, collector and base electrodes which comprise said input, output and control terminals, respectively.

14. Apparatus in accordance with claim 12 in which said source comprises a bistable circuit having a control input which when energized causes said bistable circuit to assume a particular one of its two states and including means for applying pulses to both said bistable circuit control input and the control terminal of at least one of said devices.

15. An arrangement in accordance with claim 14 in which said devices comprise transistors each of which has emitter, collector and base electrodes which comprise said input, output and control terminals, respectively.

References Cited in the file of this patent

UNITED STATES PATENTS

| | | |
|---|---|---|
| 2,470,716 | Overbeck | May 17, 1949 |
| 2,586,409 | White | Feb. 19, 1952 |
| 2,623,171 | Woods-Hill | Dec. 23, 1952 |
| 2,719,227 | Gordon | Sept. 27, 1955 |
| 2,764,349 | Hagopian | Sept. 25, 1956 |
| 2,816,226 | Forrest | Dec. 10, 1957 |
| 2,844,310 | Cartwright | July 22, 1958 |
| 2,922,985 | Crawford | Jan. 26, 1960 |

OTHER REFERENCES

Arithmetic Operations in Digital Computer, by R. K. Richards, published by Van Nostrand Co., pages 207, 208.